(No Model.)
J. PEARSON.
NUT LOCK.
No. 576,148. Patented Feb. 2, 1897.
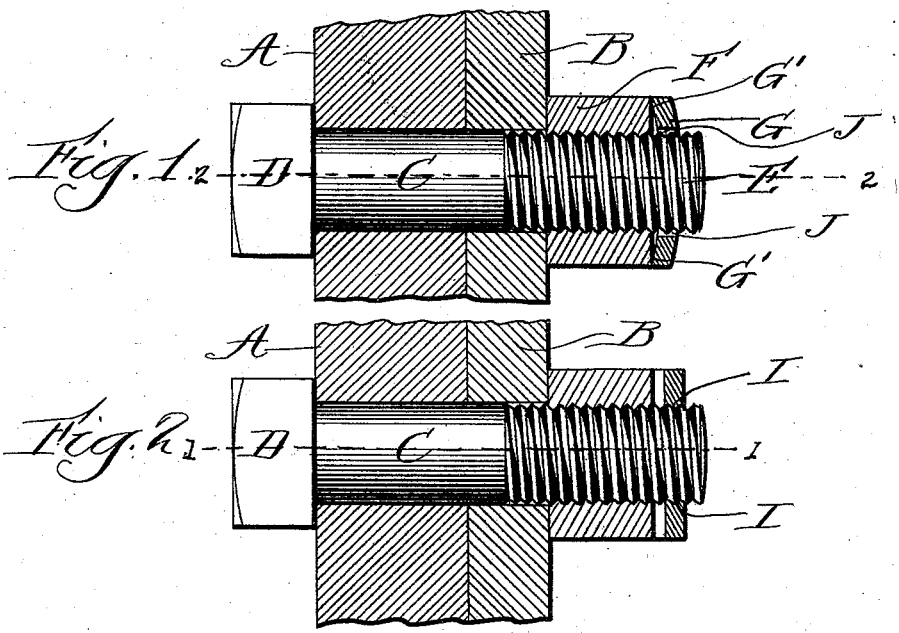
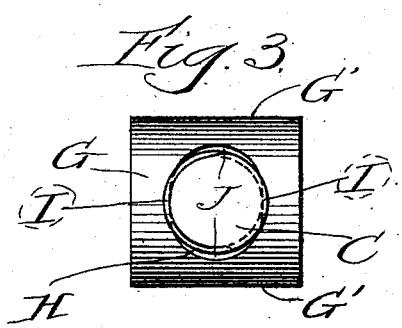
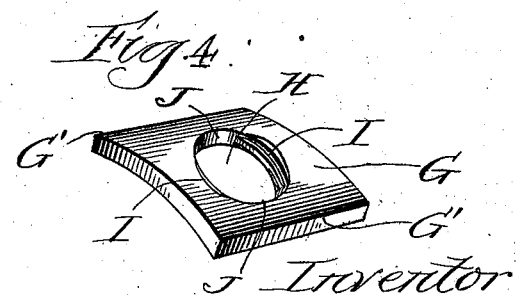
Witnesses
Wm. F. Hennin[g]
A. A. Murray
Inventor
John Pearson
by Coburn & Strong Atty's
THE NORRIS PETERS CO., PHOTO-LITHO., WASHINGTON, D. C.

UNITED STATES PATENT OFFICE.

JOHN PEARSON, OF CHICAGO, ILLINOIS.

NUT-LOCK.

SPECIFICATION forming part of Letters Patent No. 576,148, dated February 2, 1897.

Application filed May 27, 1896. Serial No. 593,260. (No model.)

*To all whom it may concern:*

Be it known that I, JOHN PEARSON, a citizen of the United States, residing at Chicago, in the county of Cook and State of Illinois, have invented a certain new and useful Improvement in Nut-Locks, which is fully set forth in the following specification, reference being had to the accompanying drawings, in which—

Figure 1 is a sectional view of a bolt and nut with my nut-lock attachment, taken on the line 1 1 of Fig. 2. Fig. 2 is a sectional view taken at right angles to Fig. 1 on the line 2 2 thereof. Fig. 3 is a plan view of my nut-lock, bolt, &c., as shown in Figs. 1 and 2. Fig. 4 is a perspective of the nut-lock attachment, such as shown in Figs. 1, 2, and 3.

My invention relates to nut-locks, and has for its object to provide a device which, while perfectly efficient as a nut-lock, shall be so economical in its construction and so simple in its form and operation as to permit of its use upon a large scale and under all circumstances.

In the drawings, A and B represent two structural parts which are to be bolted together.

C represents a bolt provided with a head D at one end and screw-threaded at the other, as at E, and adapted to receive a nut F.

G represents the nut-lock plate, which is preferably constructed as a square plate of steel slightly bent or curved into a concavo-convex form, G' G' representing the edges, which are thus bent out of the plane of the rest of the plate.

The plate G is provided with a centrally-disposed aperture H, adapted to receive the screw-threaded end of the bolt. As shown in Figs. 1, 2, 3, and 6, this aperture upon two of its sides is provided with threads I I, adapted to register and engage with the threads E, while the plate G retains its normal curved form. The aperture H upon its remaining two sides, those adjacent to the edges of the plate G' G', is somewhat elongated, leaving spaces J J between the sides of the aperture and the end of the bolt, these sides not being screw-threaded.

The operation of this device may now be explained. The nut is firmly screwed on the threaded end of the bolt. The plate G is next screwed on, turning readily upon the threaded end of the bolt by virtue of the female threads I registering and engaging with the male threads E. When the edges G' of the plate come in contact with the nut F, the plate is sprung from its normal curved plane into a more or less straight plane, according to the degree of tightness with which the said plate is screwed against the said nut. Thereby the female threads I, which previously registered with the male threads E, are themselves somewhat curved or bent out of the normal. They no longer register with the threads E, but as the plate is forced down the said threads, which are of steel, bite into the threads upon the iron bolt, and the plate G is thereby firmly locked against rotation.

The threads of the nut-lock plate which, so long as the plate retains its normal curved form, register with the threads on the end of the bolt, are themselves thrown out of their normal shape into a curved form, when the said elastic plate is flattened by being screwed against the nut. The threads of the plate bite into and bind with the soft-metal threads on the end of the bolt, and this binding holds the plate, and also the nut, firmly in position and forms a secure and economical nut-lock.

Having thus described my invention, what I claim, and desire to secure by Letters Patent, is—

As a nut-lock, the bent or curved plate G of elastic metal, provided with the aperture H, and with the screw-threads I I, on two opposite sides of said aperture, adapted normally to register with the threads on the bolt, and to be thrown out of registry as the nut-lock plate is flattened by pressure against the nut, the two remaining sides of the aperture in the nut-lock plate not engaging with the bolt, substantially as shown and described.

JOHN PEARSON.

Witnesses:
HENRY GORDON STRONG,
ALLAN A. MURRAY.